UNITED STATES PATENT OFFICE.

EDUARD HEPP, OF FRANKFORT-ON-THE-MAIN, AND RUDOLF UHLENHUTH AND FRITZ ROEMER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DYESTUFFS OF THE ANTHRAQUINONE SERIES AND PROCESS OF MAKING SAME.

1,052,480.     Specification of Letters Patent.     Patented Feb. 11, 1913.

No Drawing.     Application filed October 26, 1911. Serial No. 656,992.

*To all whom it may concern:*

Be it known that we, (1) EDUARD HEPP, Ph. D., (2) RUDOLF UHLENHUTH, Ph. D., and (3) FRITZ ROEMER, Ph. D., chemists, citizens of the Empire of Germany, residing at (1) Frankfort-on-the-Main, Germany, and (2 and 3) Höchst-on-the-Main, Germany, respectively, have invented certain new and useful Improvements in Dyestuffs of the Anthraquinone Series and Processes of Making Same, of which the following is a specification.

Our invention relates to the manufacture of a new class of dyestuffs dyeing in the vat pure yellow to orange tints, produced by causing an oxidizing agent to act upon the products formed by treating the α-dianthrimids (α-dianthraquinonylimids) or the α-trianthrimids (αα-di-αα-anthriminoanthraquinones) or their derivatives with an alkaline condensing agent, such, for instance, as an alkali, sodium amid, sodium amylate, or with a metallic chlorid, such, for instance, as aluminium chlorid.

The simplest body of the series is regarded as having the constitution of a dianthraquinonylindanthrene, and results from the combination of 2 molecular proportions of αα-dianthrimid with elimination of 2 molecules of hydrogen; the reaction is therefore similar in every respect to that by which the indanthrene is produced by means of 2 molecular proportions of α-aminoanthraquinone (see Bohn, "*Berichte*," vol. 43, page 999, 1910):

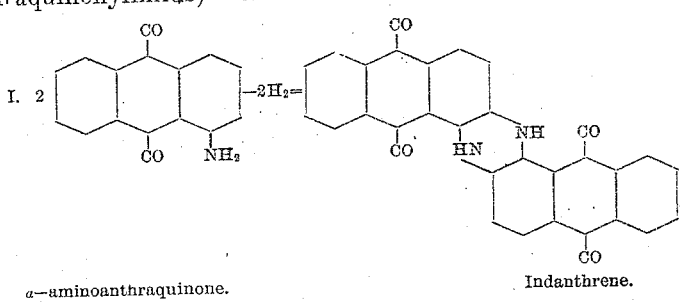

α—aminoanthraquinone.            Indanthrene.

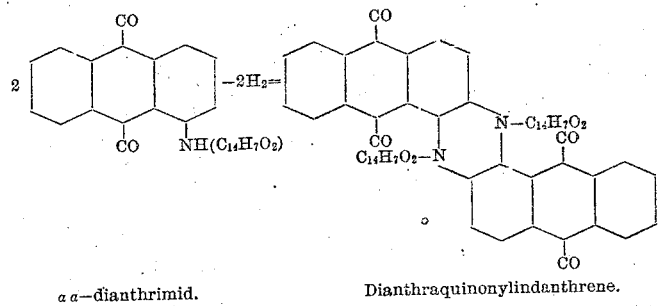

αα—dianthrimid.            Dianthraquinonylindanthrene.

The new dyestuffs may generally be regarded as perazines of the anthraquinone series. (See Wieland, "*Berichte*," vol. 41, page 3484.) When dry, they form yellow to dark-brown powders which are entirely insoluble in alkalis and diluted acids, and, with the exception of the derivative of the αα-dianthrimid, also entirely insoluble in solvents of a high boiling-point. Their solution in concentrated sulfuric acid assumes a claret-red to violet color. They dissolve in the hydrosulfites in presence of alkalis, yielding red solutions which dye cotton yellow to orange shades which are very fast to light and resist very well the action of chlorin or alkalis. The dyeing is advantageously done at ordinary temperature. The simplest bodies of the series are particularly distinguished from the original products by the purity of their tint; thus the αα-dianthraquinonylindanthrene is a pure yellow dyestuff, whereas for instance the product obtained by direct action of aluminium chlorid upon αα-dianthrimid yields on cotton, according to British Patent No. 12921 of 1910, brownish-olive tints.

In carrying out our new process we can employ a great number of oxidizing agents, such, for instance, as chromic acid or hypochlorites, the latter having generally given the best results.

For manufacturing the new dyestuffs, we can for instance, proceed as follows:

Example I: 10 kilos of the dyestuff obtained by heating the αα-dianthrimid with an alkaline condensing agent or a metallic chlorid are treated at about 80° C., in the form of a 10-20 % paste, with 200-300 liters of a solution of sodium hypochlorite containing 6.5% of active chlorin, until the paste, which is at first dark, does no longer change its color. The dyestuff is then filtered and washed with water. When dry, it forms a yellow powder, which dissolves in concentrated sulfuric acid with a claret-red color, and which dyes cotton from a red vat very fast yellow tints. It is very difficultly soluble in indifferent solvents, even when heated to boiling, and crystallizes in about 1200 times its weight of boiling nitrobenzene, or in boiling quinolin, in which it is scarcely more readily soluble, forming small orange-yellow entangled needles. When heated alone, it decomposes only at a very high temperature and partly sublimes. When heated with zinc dust it forms a well-characterized compound. The analysis of the dyestuff has given results which are well in accordance with the formula $C_{50}H_{26}N_2O_8$.

Example II: The product obtained by the action of aluminium chlorid or an alkali upon the 1.5-di-αα-anthriminoanthraquinone (α-trianthrimid) is treated, as above stated, by sodium hypochlorite. The paste, which is at first blackish, gradually becomes more and more red according as the quantity of the oxidizing agent is increased. The operation is considered to be complete when the desired tint is obtained. The dyestuff thus produced forms, when dry, a reddish-brown powder; it dissolves to a violet solution in concentrated sulfuric acid, thus yielding a solution from which it is precipitated in the form of orange-yellow flakes by the addition of water. It dyes cotton from a red vat orange-yellow tints. The body is entirely insoluble even in solvents of a very high boiling point.

Having now described our invention, what we claim is:

1. The process of producing new anthraquinone dyestuffs, which consists in treating with oxidizing agents the products resulting from the condensation of αα-anthrimino compounds, obtained from an α-aminoanthraquinone compound and an α-chloranthraquinone compound.

2. The process of producing a new anthraquinone dyestuff, which consists in treating with hypochlorites the product obtained by condensing αα-dianthrimid.

3. As new products, the herein-described new dyestuffs, obtainable by treating with oxidizing agents the products resulting from the condensation of αα-anthrimino compounds obtained from an α-aminoanthraquinone compound and an α-chloranthraquinone compound, which dyestuffs, when dry, are yellow to brownish-red powders, insoluble in alkalis and in diluted acids and very little soluble in the usual organic solvents, dyeing cotton from the vat fast yellow to orange shades, substantially as hereinbefore described.

4. As a new product, the herein-described αα-dianthraquinonelindanthrene, possessing a constitution agreeing with the formula $C_{50}H_{26}N_2O_8$, which dyestuff is insoluble in water and in diluted acids and alkalis, difficultly soluble in most organic solvents, soluble in concentrated sulfuric acid, yielding a claret-red solution dyeing cotton in the hydrosulfite vat yellow shades which are very fast to the light and resist very well chlorin and alkalis, substantially as hereinbefore described.

In testimony whereof, we affix our signatures in presence of two witnesses.

EDUARD HEPP.
RUDOLF UHLENHUTH.
FRITZ ROEMER.

Witnesses:
 JEAN GRUND,
 CARL GRUND.